(12) United States Patent
Raff et al.

(10) Patent No.: US 7,476,125 B2
(45) Date of Patent: Jan. 13, 2009

(54) ELECTRICAL COUPLING SYSTEM

(75) Inventors: Thomas Raff, Dettenhausen (DE); Marcin Rejman, Waiblingen (DE); Daniel Hirt, Kirchentellinsfurt (DE); Josef Baumgartner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/696,258

(22) Filed: Apr. 4, 2007

(65) Prior Publication Data
US 2007/0237539 A1 Oct. 11, 2007

(30) Foreign Application Priority Data
Apr. 7, 2006 (DE) .......................... 10 2006 018 001

(51) Int. Cl.
*H01R 3/00* (2006.01)
(52) U.S. Cl. .................................... 439/500; 439/924.1
(58) Field of Classification Search ................ 439/535, 439/500, 76.1, 86, 924.1
See application file for complete search history.

(56) References Cited

U.S. PATENT DOCUMENTS 4,319,178 A * 3/1982 Sugalski ..................... 320/110
4,608,528 A * 8/1986 Stillwell ..................... 320/113
5,059,885 A * 10/1991 Weiss et al. ................. 320/115
6,921,285 B2 7/2005 Glauning

FOREIGN PATENT DOCUMENTS

DE 102 12 750 4/2006
GB 2 386 746 9/2003

* cited by examiner

*Primary Examiner*—Tho D Ta
*Assistant Examiner*—Travis Chambers
(74) *Attorney, Agent, or Firm*—Michael J. Striker

(57) ABSTRACT

A system for electrically coupling an electrical supply unit for cordless electrical devices, hand-held power tools in particular, with a charging device, with the electrical supply unit is located in a housing in which at least one rechargeable battery that can be recharged using the charging device is located, and the electrical supply unit and the charging device each have at least a first and a second contact element, wherein the first and second contact elements of the electrical supply unit interact with the first and second contact elements of the charging device such that the charging procedure takes place only when the electrical supply unit is in a defined end position in the charging device.

8 Claims, 4 Drawing Sheets

ELECTRICAL COUPLING SYSTEM

CROSS-REFERENCE TO A RELATED APPLICATION

The invention described and claimed hereinbelow is also described in German Patent Application DE 102006018001.1 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The present invention relates to a system for electrically coupling a charging device with an electrical supply unit.

Cableless electrical devices, hand-held power tools in particular, with a mains-independent voltage supply for the electric motor have enjoyed extensive use in recent years, because independence from the voltage network offers many advantages for the handling of hand-held power tools of this type. The rechargeable batteries for voltage supply are integrated in the hand-held power tool or they are attached to the housing of the hand-held power tool as a rechargeable battery pack. To charge the rechargeable battery pack, the hand-held power tool or the rechargeable battery pack are coupled with a charging device. It is known from the related art that, in order to charge the rechargeable battery, the rechargeable battery pack is separated from the electrical device or it remains connected with the electrical device. If the rechargeable batteries are permanently integrated in the electrical device, the electrical device can be placed on the charging device, where it is held in place by gravity.

Publication DE 102 12 750 A, e.g., makes known a hand-held power tool such as a drill or a drill/driver, to the housing of which a rechargeable battery pack system can be attached. Snap-in elements are provided for mechanically connecting the housing with the rechargeable battery pack system, and contact elements are provided for the electrical connection. The rechargeable battery pack can be attached, e.g., at the base of the handle of the hand-held power tool. At least one lateral surface of the rechargeable battery pack is designed as a support surface, thereby enabling the hand-held power tool to be placed on a flat surface when the rechargeable battery pack system is attached.

Known electrical devices powered by rechargeable battery packs, hand-held power tools in particular, have the disadvantage that the process of charging the rechargeable battery pack can also take place, under certain circumstances, when the rechargeable battery pack or the electrical device are not fully engaged in the charging device. Under certain circumstances, it is therefore possible that the charging process will take place in an uncontrolled manner. When this happens, it is not ensured that the rechargeable battery pack will be in a fully recharged state after the electrical device has spent a certain amount of time in the charging device.

SUMMARY OF THE INVENTION

Accordingly, it is an object of the present invention to provide an electrical coupling system for electrically coupling a charging device with an electrical supply unit, which eliminates the disadvantages of the prior art.

The inventive system for electrically coupling a supply unit and a charging unit is designed such that the at least first and second contact element of the electrical supply unit interact with the at least first and second contact element of the charging device in a manner such that the charging procedure takes place only when the electrical supply unit is located in a defined end position in the charging device. This has the advantage that the charging procedure cannot take place when the supply unit is in any other position in the charging device, therefore ensuring that the charging procedure always takes place in a controlled manner. If the supply unit is inserted into the charging device incorrectly, the charging procedure does not take place.

Within the framework of the present invention, a "defined end position of the electrical supply unit in the charging device" is understood to mean the position in which the supply unit is accommodated in the charging unit as intended, in a form-fit and/or non-positive manner, and it is connected with the charging device such that it is detachable and is held securely in the correct position. When the supply unit is in the end position, it is held securely in the correct position in the charging device, particularly with a slight amount of play. In the end position, the first contact element of the charging device is in contact with the first contact element of the supply unit, and the second contact element of the charging device is in contact with the second contact element of the supply unit, i.e., the charging device and the supply unit are in the electrically coupled state and, in particular, they are also in the mechanically coupled state.

In particular, the first and second contact elements of the electrical supply unit are in full contact with the first and second contact elements of the charging device only in the end position, thereby ensuring that the charging procedure takes place only in the end position.

Preferably, at least a first contact element of the charging device extends further outwardly than a second contact element of the charging device, or at least a first contact element of the electrical supply unit extends further outwardly than a second contact element of the electrical supply unit. In particular, the first contact element and the second contact element of the charging device and/or the electrical supply unit are located next to each other, e.g., on an outer lateral surface of the supply unit and on a lateral surface of a recess of the charging device that accommodates the supply unit. The contact elements can also be provided on an underside of the electrical supply unit or on a surface of the charging device.

In particular, when the charging device includes a recess on its upper side for accommodating the supply unit, the contact elements can be located in the base surface of the recess of the charging device. Within the framework of the present invention, "extending further outwardly" is understood that the first contact element extends further outwardly than the second contact element, so that the first contact element and the second contact element do not terminate in the same plane, for example. The first contact element can extend further outwardly than the second contact element, e.g., in terms of length, height, or depth. The further outward extension of a first contact element relative to a second contact element ensures that, in a charging state that does not correspond to the end position, the second contact elements cannot come in contact with each other and, therefore, the charging procedure cannot take place.

In particular, a first contact element extends further outwardly than a second contact element such that the first contact element does not terminate in the same plane as the second contact element. In a first embodiment, for example, the first contact element can be designed to extend further outwardly than the second contact element by the first contact element extending further outwardly than the second contact element lengthwise. When the two contact elements are located, e.g., in a lateral surface, the first contact element extends further outwardly than the second contact element. This means the free end of the first contact element extends out of the lateral surface further than the free end of the second contact element. This can be realized, e.g., by designing the first contact element to be longer than the second contact element. As an alternative, the first contact element and the second contact element can be designed essentially equal in length. The first contact element is located on a projection in the side wall, however, so that, due to the projection in the side wall, the first contact element extends further outwardly than the second contact element.

In a second, alternative embodiment, the first contact element can also be designed to extend further outwardly than the second contact element such that the first contact element extends further outwardly than the second contact element in terms of height. This can be realized, e.g., by designing the first contact element to be taller than the second contact element. As an alternative, the first and second can also be designed essentially equal in height, although the first contact element is located on a raised area, a projection, or the like, so that the first contact element extends further outwardly than the second contact element due to the raised area. In this second embodiment, the two contact elements are located, e.g., in a base surface of the charging device and/or the electrical supply unit. The contact elements extend out of the base surface.

The contact elements of the charging device or the supply unit form counter-contact elements with the contact elements of the particular other device (i.e., the charging device or the supply unit). In a simple embodiment, the contact elements of the supply unit are designed, e.g., as counter-contact elements that are located next to each other and in the same plane, e.g., on the underside or on a side wall of the supply unit. Located under the contact elements of the charging device is at least one first contact element that extends further outwardly than a second contact element. Analogously, and vice versa, the contact elements of the charging device can be designed as counter-contact elements. In this case, at least one first contact element of the supply unit extends further outwardly than a second contact element of the supply unit.

Given the requirement that all contact elements of the one device (i.e., the charging device or the supply unit) come in contact with all contact elements of the other device (i.e., the charging device or the supply unit) only in the end position—and that at least one first contact element of one of the two devices (i.e., the charging device or the supply unit) extend further outwardly than a second contact element—any arrangement of the contact elements relative to each other is possible. For example, as an alternative to the simple embodiment described above, the counter-contact elements can be located in the same plane, and they can be offset relative to each other, i.e., they can extend further outwardly than an adjacent contact element.

The contact elements can be designed as touch contact elements or as sliding contact elements. Touch contact elements and sliding contact elements are known per se from the related art. The contact elements can also be designed to be resilient; preferably at least one contact element is designed to be resilient. Resilient contact elements (contact springs) are also known per se from the related art.

Preferably at least one contact element—that extends further outwardly than a second contact element—is also designed as a resilient contact element. It does not matter if the resilient first contact element is a first contact element of the supply unit or if it is a first contact element of the charging device. The first contact element, which is designed as a spring contact element, and any further resilient contact elements can be located in the charging device or in the supply unit.

The resilience of at least one first contact element is designed such that the particular second contact elements of the supply unit and the charging device also come in contact with each other only in the end position. This means that the load placed on the resilience of the first contact element in the end position is so great that the two second contact elements also come in contact with each other.

If the supply unit is placed in the charging device incorrectly, i.e., not in the end position, it can happen that the particular first contact elements of the charging device and the supply unit will come in contact with each other anyway, even though the end position has not yet been reached. Since, however, at least one first contact element extends further outwardly than a second contact element, the two second contact elements do not come in contact with each other in this incorrect charging state. A charging process can therefore not take place in this charging state. The two second contact elements come in contact with each other only when the end position is reached, since, in this end position, the spring of the at least one resilient, first contact element is loaded so greatly that the distance between the first contact element—that extends further outwardly than the second contact element—and the second contact element is compensated and/or eliminated to the extent that the particular second contact elements of the charging device and the supply unit are in contact with each other.

According to the present invention, at least two contact elements are provided in the charging device and at least two contact elements are provided in the supply unit. It is also possible to provide three, four or several contact elements in the charging device and the supply unit. If only two contact elements are provided, they serve as contact elements for the voltage supply. If more than two, e.g., three or four, contact elements are provided in the charging device and the supply unit, then the further contact elements serve to transmit data. The contact elements can have the same design or different designs. They are switched in accordance with their function, i.e., to supply voltage or to exchange data.

The first and second contact elements of the charging device and the electrical supply unit, respectively, can be, e.g., two contact elements for voltage supply. If more than two contact elements are provided in the charging device and the supply unit, the first contact element and/or the second contact element can also be contact elements for data transmission. Accordingly, the first contact element—that is designed to extend further outwardly than the second contact element—and the second contact element can have any combination of functions, i.e., both contact elements can be used for voltage supply or data transmission, or one of the two contact elements can be used for voltage supply and the other can be used for data exchange.

If more than two contact elements are provided in the charging device and the supply unit, it is possible for more than one contact element to be designed to extend further outwardly than a second contact element. If, e.g., three or four contact elements are provided, then two, three or four contact elements can be designed to extend further outwardly than one, two, three or four contact elements.

In the inventive system for the electrical coupling of the charging device and the supply unit, it is also possible to provide mechanical coupling elements and/or guide elements, which ensure that the supply unit can be easily and reliably inserted into and held in the end position. The mechanical coupling elements and/or guide elements are located in the charging device and in the supply unit. They engage in each other and thereby create a form-fit connection between the supply unit and the charging device. The mechanical coupling means can be, e.g., a projection in the charging device and a recess in the supply unit. In this case, the projection engages in the recess and creates a form-fit connection.

The electrical supply unit of the inventive system for electrical coupling contains at least one rechargeable battery. It can be a rechargeable battery pack that is detachably connectable with an electrical device, particularly a hand-held power tool, e.g., a rotary hammer, a drill/driver, a screwdriver, etc. It is provided that the electrical supply unit is located in the charging device—either with or without the electrical device—in order to carry out the charging procedure. As an alternative, the electrical supply unit, which contains at least one rechargeable battery pack, can also be integrated in the housing of the electrical device, of the hand-held power tool in particular. In this embodiment, the electrical device with integrated supply unit is inserted, placed, etc., in the charging device in order to charge the rechargeable battery. Accordingly, the housing in which the electrical supply unit is located is a separate housing for accommodating the at least one rechargeable battery, or it is the housing of an electrical device in which the rechargeable battery is integrated.

To mechanically couple the electrical supply unit with the charging device, the supply unit includes at least one guide element, which is preferably located in the front region of the housing. The guide element is preferably at least one guide rail. The at least one guide element engages in a corresponding receiving device located on the charging device; the combination of the at least one guide element and the receiving device functions as a flexible coupling or a slide-in, rear-engagement seat. The mechanical coupling system advantageously provides the electrical device—which is coupled with the charging device—with greater stability and a much better hold on the charging device, while ensuring easy handling. A guide rail in the front region of the housing of the supply unit serves to center the supply unit on the charging device. The guide rail—as part of the flexible coupling—absorbs a portion of the acting forces. A guide rail also advantageously prevents the supply unit from tipping laterally or backward.

The housing in which the supply unit is accommodated is advantageously held in an end position, i.e., in the coupled state, by a spring with a spring contact force. Advantageously, the spring that applies the spring contact force is designed to deflect to the extent that the guide rail disengages from the receiving device in reaction to a sudden force, e.g., when the charging device—together with the electrical supply unit—is dropped and lands on a hard surface, and the housing of the supply unit can become detached from the charging device, thereby ensuring that neither the housing nor the charging device are damaged due to a rigid connection/coupling.

Advantageously, the spring that applies the spring contact force to establish the electrical contact between the supply unit and the charging device is designed as an electrical contact spring.

Particularly advantageously, the at least one guide rail and the corresponding receiving device are designed such that the flexible coupling allows a swiveling motion to be carried out from a starting position downward into an end position, and from the end position upward into the starting position. This results in easy handling when coupling the electrical supply unit with the charging device. Before being coupled with the charging device, the electrical supply unit can be separated from the electrical device or it can remain connected with the electrical device, depending on the design of the supply unit and/or the arrangement of the electrical contacts for establishing electrical contact between the supply unit and the charging device.

The mechanical coupling of the electrical supply unit with the charging device takes place by inserting the at least one guide rail of the electrical supply unit into the corresponding receiving device of the charging device, in the starting position, and then swiveling the supply unit from the starting position downward into the end position.

The end position is reached, e.g., when a housing base of the supply unit strikes a surface of a recess in the charging device. The electrical supply unit is held in the end position by a spring contact force, similar to a ski binding. The spring contact force is produced, e.g., by an electrical contact spring, which is acted upon by an actuating element located on the housing of the electrical supply unit. In addition, the electrical supply unit and the charging device are in electrical contact with each other in the end position, thereby ensuring that the at least one rechargeable battery of the electrical supply unit is charged.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
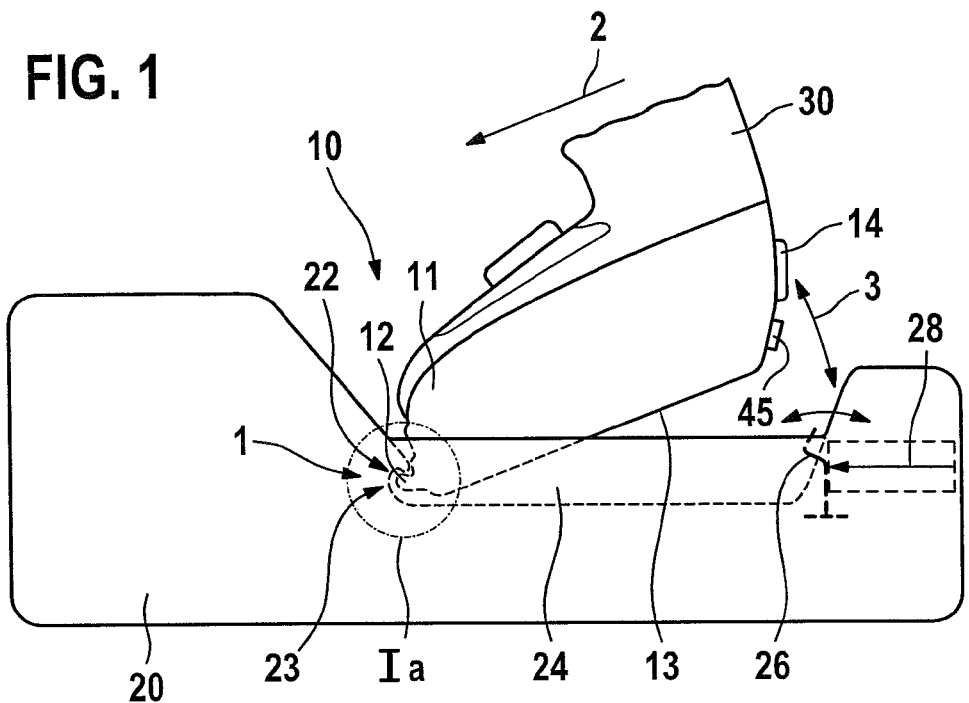
FIG. 1 is a schematic block diagram of a system for coupling an electrical supply unit with a charging device using a flexible coupling
Figure 1A:
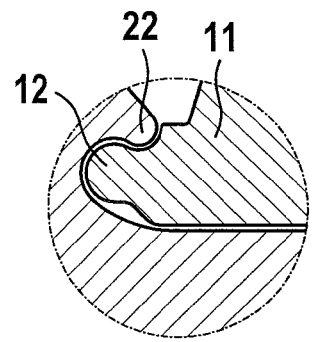
FIG. 1a is an enlargement of a section of the mechanical coupling shown in FIG. 1
Figure 2:
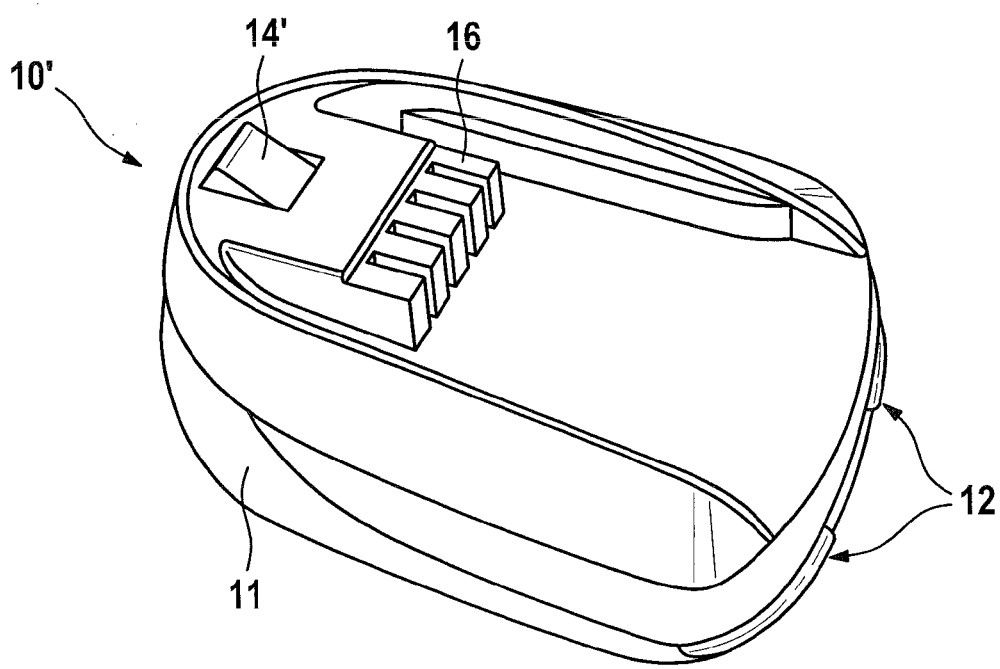
FIG. 2 is a perspective illustration of an electrical supply unit that has been separated from the electrical device

As shown in FIGS. 1 and 2, an inventive electrical supply unit 10, 10' for cordless electrical devices 30 includes a housing 11 for mechanically coupling with a charging device 20. Housing 11 includes at least one guide rail 12 in the front region and an actuating element 14, 14' in the rear region.

As also shown in FIG. 1, electrical supply unit 10 is connected with an electrical device 30 during the mechanical coupling with charging device 20. Electrical device 30 is shown as an example in FIG. 1, i.e., electrical supply unit 10 could also be integrated permanently in electrical device 30. Electrical supply unit 10, 10' can be used for mobile, portable devices such as power tools designed as cordless drills, cordless screwdrivers, gardening devices, etc.

FIG. 2 shows a supply unit 10' that has been separated from electrical device 30, with two guide rails 12 located in the front region, an actuating element 14' located in the rear region of supply unit 10', and electrical contacts 16, via which supply unit 10' can be contacted electrically with charging device 20 during a charging procedure. For cordless operation, associated electrical device 30 can be connected electrically with supply unit 10' via electrical connections 16.

As also shown in FIG. 1, an inventive charging device 20 includes—for mechanical coupling with electrical supply unit 10, 10'—a recess 24, on the one end of which a receiving device 22 is located, in which the at least one guide rail 12 of electrical supply unit 10, 10' engages for mechanical coupling. A spring 26 that is designed, e.g., as an electrical contact spring, is located on the opposite end of receiving device 22. Actuating element 14, 14' located in the rear region of electrical supply unit 10, 10' therefore acts on spring 26 such that electrical supply unit 10, 10' is held in an end position in charging device 20 via spring contact force 28 of spring 26.

As also shown in FIG. 1, inventive system 1 includes—for mechanical coupling—at least one guide strip 12 that is located in the front region of housing 11 of electrical supply unit 10, 10', and corresponding receiving device 22 located on charging device 20. In order to mechanically couple electrical supply unit 10, 10' with charging device 20, guide rail 12 engages in corresponding receiving device 22; the combination of the at least one guide rail 12 and receiving device 22 functions as a flexible coupling 23. Flexible coupling 23 allows a swiveling motion to be carried out from a starting position downward into an end position, and from the end position upward into the starting position. The two possible swiveling directions are indicated in FIG. 1 as double arrow 3.

To mechanically couple electrical supply unit 10, 10' with charging device 20, the at least one guide rail 12 is inserted using a sliding motion in the direction of arrow 2 into corresponding receiving device 22, thereby resulting in starting position shown in FIG. 1. Supply unit 10, 10' is then pressed downward into the end position via the swiveling motion defined by flexible coupling 23. The end position is reached when a housing base 13 of supply unit 10 strikes a surface of recess 24 in charging device 20. Electrical supply unit 10, 10' is held in the end position by spring contact force 28 of spring 26. In the end position, electrical supply unit 10, 10' and charging device 20 are in electrical contact with each other via spring 26, which also serves as an electrical contact spring, thereby ensuring that the batteries (not shown) of electrical supply unit 10, 10' can be charged.

Figure 3:
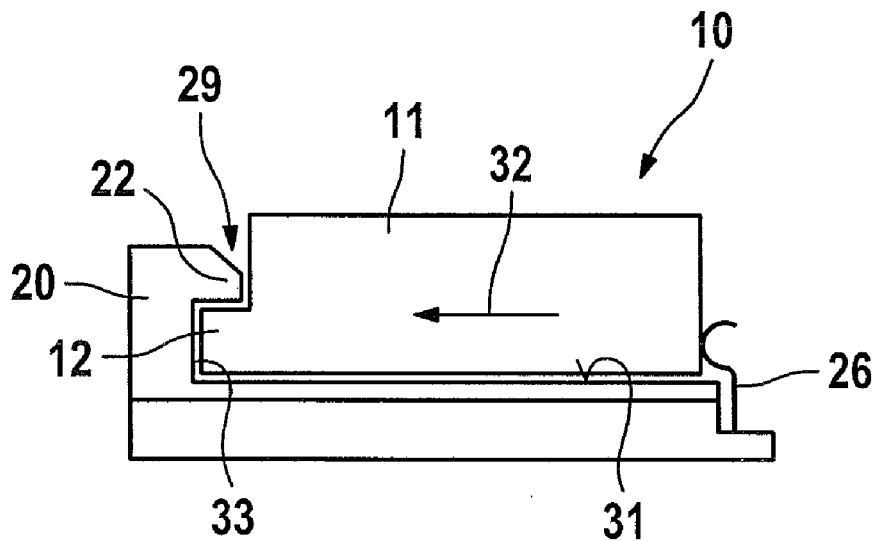
FIG. 3 is a schematic illustration of a system for coupling an electrical supply unit with a charging device using a slide-in, rear-engagement seat

FIG. 3 shows a schematic illustration of a system for coupling an electrical supply unit with a charging device using a slide-in, rear-engagement seat 29. The elements and components that are identical to those in the previous figures are labeled with the same reference numerals. Supply unit 10 in FIG. 1 is shown. Supply unit 10 includes guide rail 12 in the front region that engages in receiving device 22 of charging device 20. Guide rail 12 and receiving device 22 are designed such that guide rail 12 can engage with receiving device 22 only by being slid into it. To this end, supply unit 10 or its housing 11 are placed on a surface 31 of charging device 20 and is then slid along on plane 31 in the direction of arrow 32 so that guide rail 12 is slid into receiving device 22.

Receiving device 22 includes a rectangular recess 33 that accommodates guide rail 12, which is also rectangular. The dimensions of recess 33 and guide rail 12 are chosen such that housing 11 must be slid in direction of arrow 32 in order to couple housing 11 and charging device 20, or housing 11 must be slid in the direction opposite to arrow 32 to separate housing 11 and charging device 20. With this embodiment, it is therefore not possible to couple or separate housing 11 and supply unit 10 using a swiveling motion. Spring 26 that is designed, e.g., as an electrical contact spring, is located on the opposite end of receiving device 22 of charging device 20. Spring 26 acts on housing 11 of electrical supply unit 10 such that housing 11 is held in recess 33 and, therefore, against charging device 20, by guide rail 12.

Figure 4:
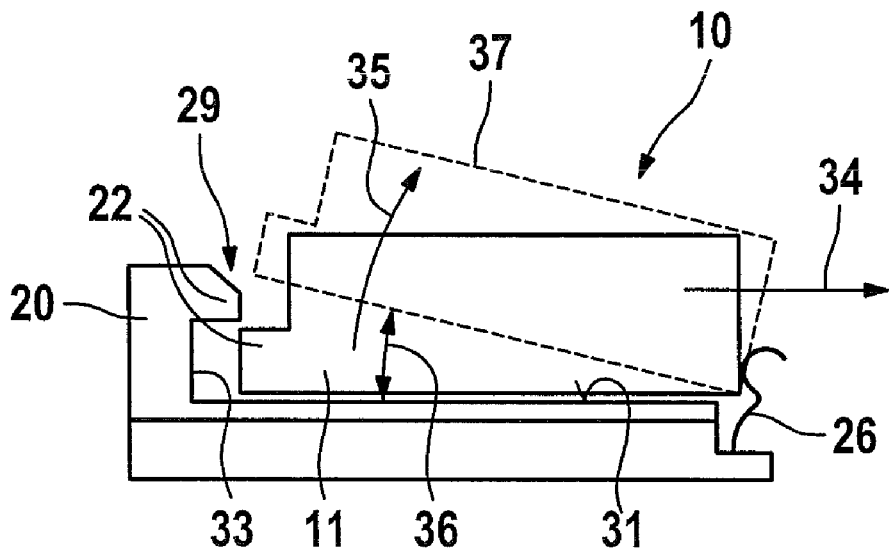
FIG. 4 shows the system in FIG. 3, in a decoupled state

FIG. 4 is a schematic illustration of the system in FIG. 3. In FIG. 4, the system is in a state that allows housing 11 to be detached from charging device 20. To this end, housing 11 is slid in the direction opposite to arrow 34 against spring 26, so that guide rail 12 of housing 11 moves out of recess 33 of receiving device 22, and spring 26 is deflected. When guide rail 12 is moved out of recess 33, housing 11 can be swiveled in the direction of arrow 35 in order to remove electrical supply unit 10 from charging device 20.

To insert housing 11 into charging device 20, housing 11 is placed on surface 31 of charging device 20 with its rear region at an angle 36, as illustrated by a dashed-line outline 37 of housing 11, thereby deflecting spring 26. Housing 11 is then tilted entirely onto surface 31 of charging device 20, so that guide rail 12 can be slid into recess 33 of receiving device 22.

Slide-in, rear-engagement seat 29, flexible coupling 23, and spring 26 are designed such that slide-in, rear-engagement seat 29 and flexible coupling 23 can become detached automatically. To this end, the shape and force of spring 26 are selected such that housing 11 can automatically detach from the slide-in, rear-engagement seat and/or the flexible coupling when the charging device and housing 11 are acted upon by a critical burst of force, e.g., when they are dropped onto a hard surface. To this end, spring contact force 28 of spring 26 is selected such that spring 26 can not be deflected until a certain level of force has been applied—which can also be applied intentionally, of course, by moving the housing—so that housing 11 can be detached from the charging device. Spring 26 can be deflected so far that guide rail 12 can come out of receiving device 22.

Figure 5:
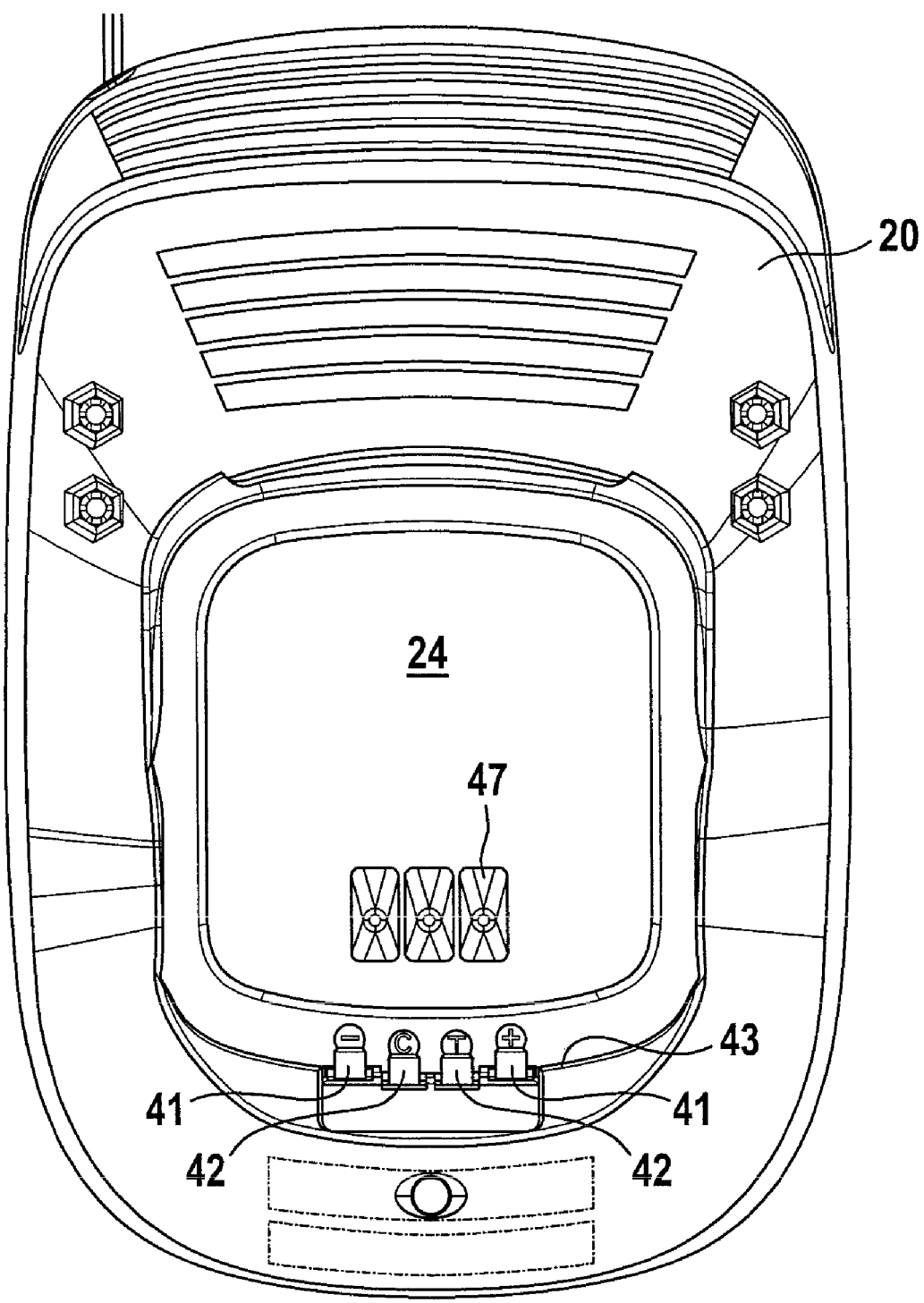
FIG. 5 is a top view of the charging device with contact elements

In the top view of a preferred embodiment of a charging device 20 according to FIG. 5, one can see receptacle 24 for accommodating supply unit 10, and contact elements 41, 42 provided for electrically coupling charging device 20 with supply unit 10. In the embodiment shown, four contact elements 41, 42 are provided in charging device 20. Accordingly, supply unit 10 also includes four contact elements 45, which serve as counter-contact elements. Two contact elements 41 are used for voltage supply, and two contact elements 42 are used to transmit data. Contact elements 41, 42 are located next to each other, although they can be positioned in any order. According to the present invention, contact elements 41, 42 of the charging device, and contact elements 45 of the supply unit interact such that the charging procedure takes place only when electrical supply unit 10 is in the defined end position in charging device 20. This is possible because a first contact element 41 of charging device 20 extends further outwardly than a second contact element 42 of charging device 20.

Figure 5A:
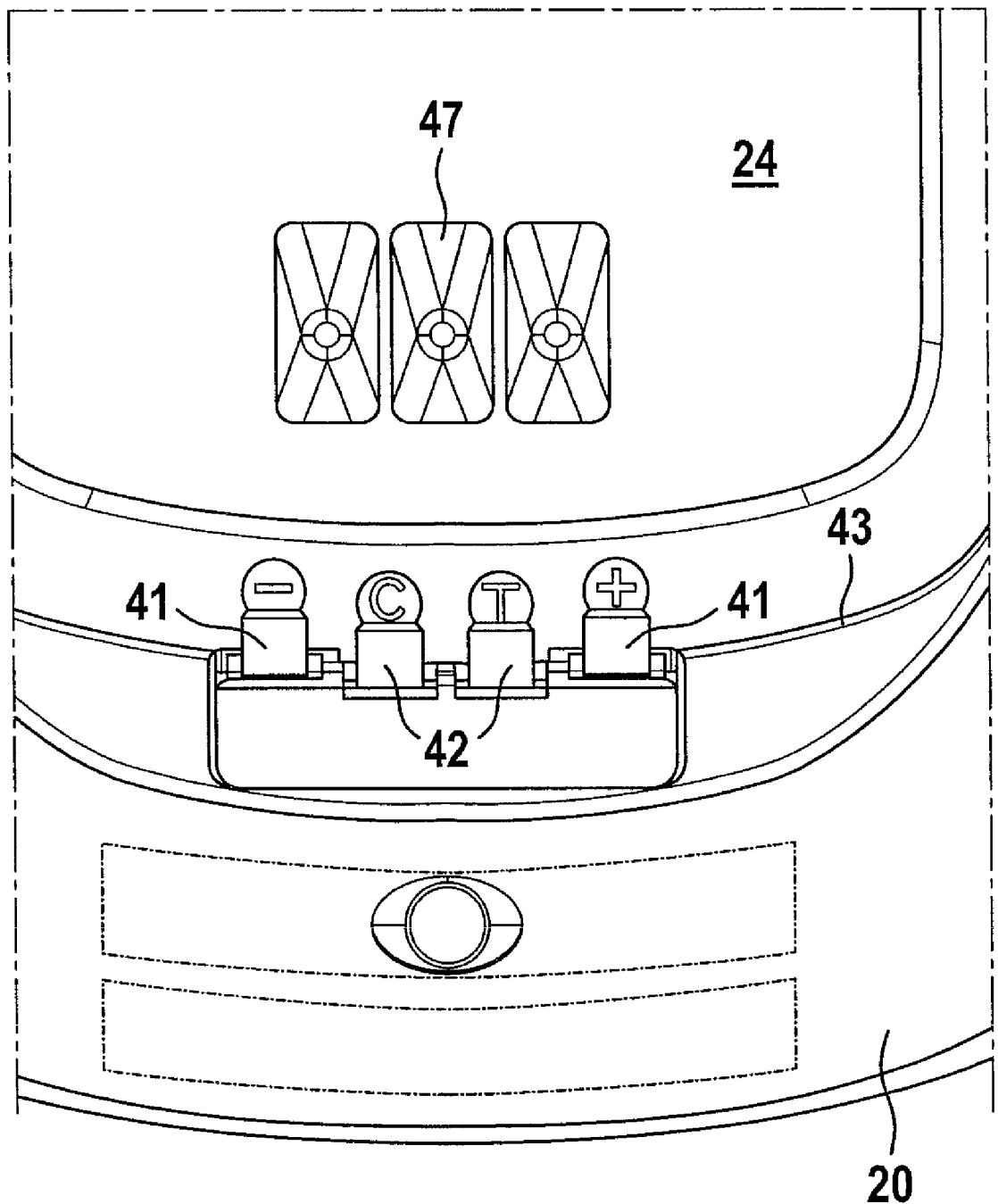
FIG. 5a is an enlargement of a section of the charging device in FIG. 5 in the region of the contact elements.

The further outward extension is shown clearly in the enlargement in FIG. 5*a* in particular. In the region of recess 24, contact elements 41, 42 are located in the region of side wall 43. In the embodiment shown, the two contact elements 41 for voltage supply extend further out of side wall 43 than the two contact elements 42 for data transmission. A first contact element 41 therefore projects further outwardly than a second contact element 42. At the least, the further outwardly-extending, first contact elements 41 are designed as spring contact elements. When supply unit 10 is in the end position in charging device 20, first contact elements 41 are pressed upon by corresponding first counter-contact elements 45 of the supply element so strongly, i.e., in the direction toward the side wall, that second contact elements 42 behind them are also contacted by corresponding second counter-contact elements 45 of the supply unit.

The relative positioning and/or the spring force of resilient contact elements 41 is chosen such that all four contact elements 41, 42 are in contact with particular counter-contact elements 45 of the supply unit only in the end position. The two second contact elements 42, 45 also do not come in contact with each other until the end position is reached, since, in this end position, the resilient first contact element 41 is acted upon so strongly that the distance between first contact element 41—that extends further outwardly than second contact element 42—and second contact element 42 is compensated or eliminated to the extent that particular second contact elements 42, 45 of charging device 20 and supply unit 10 come in contact with each other.

Additional mechanical coupling elements and/or guide elements 47 are depicted in FIGS. 5 and 5a, which ensure that supply unit 10 can be brought into and held in the end position easily and reliably. In the embodiment shown, the mechanical coupling elements and/or guide elements are provided in the region of recess 24, and they are designed in the shape of projections, i.e., pyramid-shaped projections in particular. They engage in not-shown recesses in housing base 13 and thereby create a form-fit connection between supply unit 10 and charging device 20.

It will be understood that each of the elements described above, or two or more together, may also find a useful application in other types of constructions differing from the type described above.

While the invention has been illustrated and described as embodied in an electrical coupling system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A system for electrically coupling an electrical supply unit with a charging device, wherein the electrical supply unit is located in a housing in which at least one rechargeable battery which is rechargeable using the charging device is located, the system comprising first and second contact elements provided in the electrical supply unit and in the charging device, said first and second contact elements of the electrical supply unit interacting with said first and second contact elements of the charging device such that the charging procedure take place only when the electrical supply unit is in a defined end position in the charging device, and wherein said first contact element of the charging device extends further outwardly than said second contact element of said charging device and said first contact element of the electrical supply unit extends further outwardly than said second contact element of the electrical supply unit.

2. A system as defined in claim 1, wherein said first and second contact elements are configured so that said first and second contact elements of the electrical supply unit are in full contact only when said first and second contact elements of the charging device are in the end position.

3. A system as defined in claim 1, wherein at least one of said contact elements of the charging device is a spring-loaded contact element.

4. A system as defined in claim 1, wherein at least one of said contact elements of the electrical supply unit is a spring-loaded contact element.

5. A system as defined in claim 1, wherein at least one of said contact elements of the charging device or the supply unit has a spring action that is designed such that said second contact elements of the supply unit and the charging device are in contact with each other only in the end position.

6. An electrical device, comprising an electrical supply unit; a charging device, wherein said electrical supply unit is located in a housing in which at least one dischargeable battery chargeable with said charging device is located; and a system for electrically coupling said electrical supply unit with said charging device, said system including first and second contact elements provided in the electrical supply unit and in the charging device, said first and second contact elements of the electrical supply unit interacting with said first and second contact elements of the charging device such that the charging procedure take place only when the electrical supply unit is in a defined end position in the charging device, and wherein said first contact element of the charging device extends further outwardly than said second contact element of said charging device and said first contact element of the electrical supply unit extends further outwardly than said second contact element of the electrical supply unit.

7. An electrical supply unit, comprising a system for electrically coupling the electrical supply unit with a charging device, said system including first and second contact elements provided in the electrical supply unit and in the charging device, said first and second contact elements of the electrical supply unit interacting with said first and second contact elements of the charging device such that the charging procedure take place only when the electrical supply unit is in a defined end position in the charging device, and wherein said first contact element of the charging device extends further outwardly than said second contact element of said charging device and said first contact element of the electrical supply unit extends further outwardly than said second contact element of the electrical supply unit.

8. A charging device, comprising a system for electrically coupling an electrical supply unit with a charging device, said system including first and second contact elements provided in the electrical supply unit and in the charging device, said first and second contact elements of the electrical supply unit interacting with said first and second contact elements of the charging device such that the charging procedure take place only when the electrical supply unit is in a defined end position in the charging device, and wherein said first contact element of the charging device extends further outwardly than said second contact element of said charging device and said first contact element of the electrical supply unit extends further outwardly than said second contact element of the electrical supply unit.

\* \* \* \* \*